United States Patent Office 3,184,243
Patented May 18, 1965

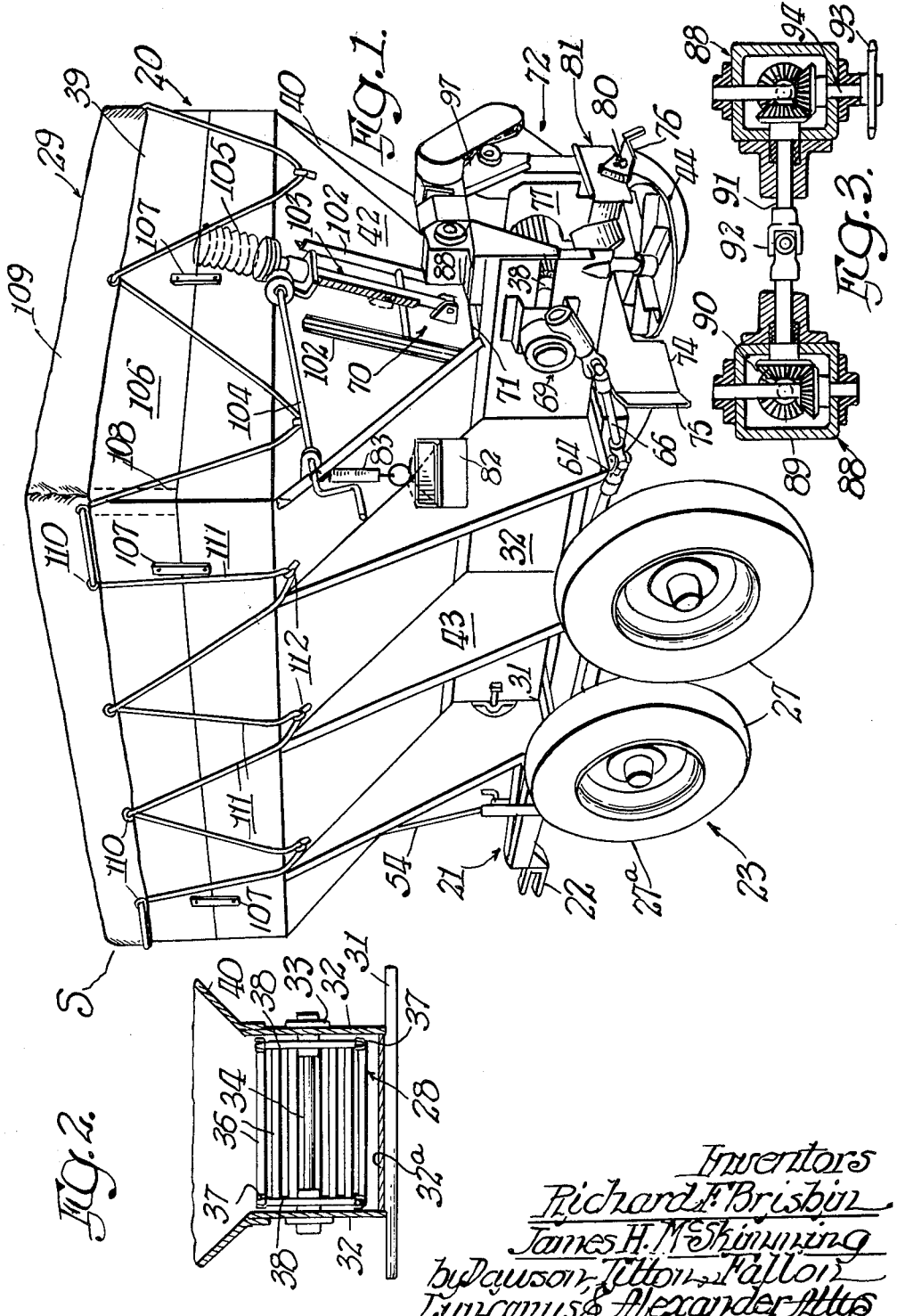

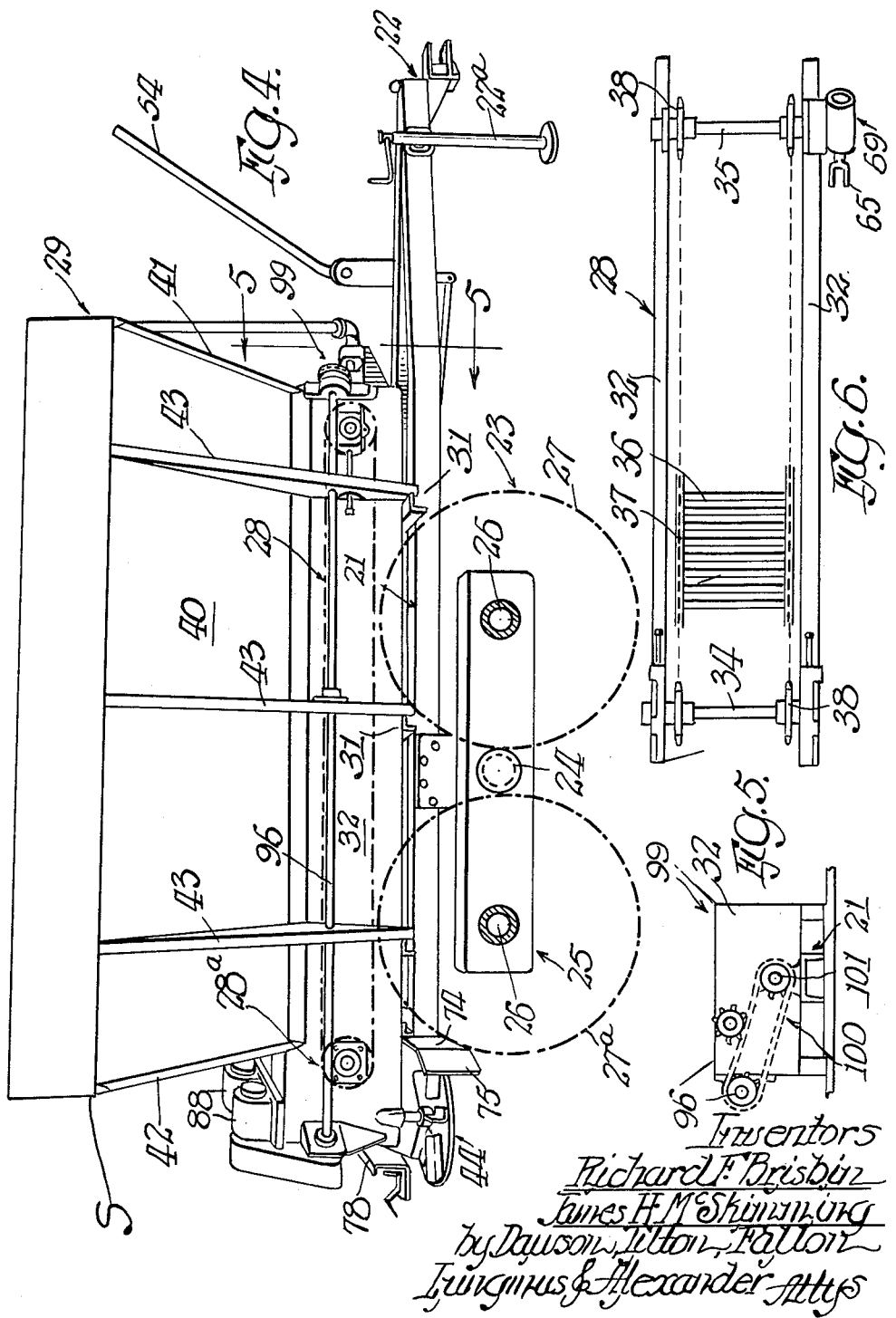

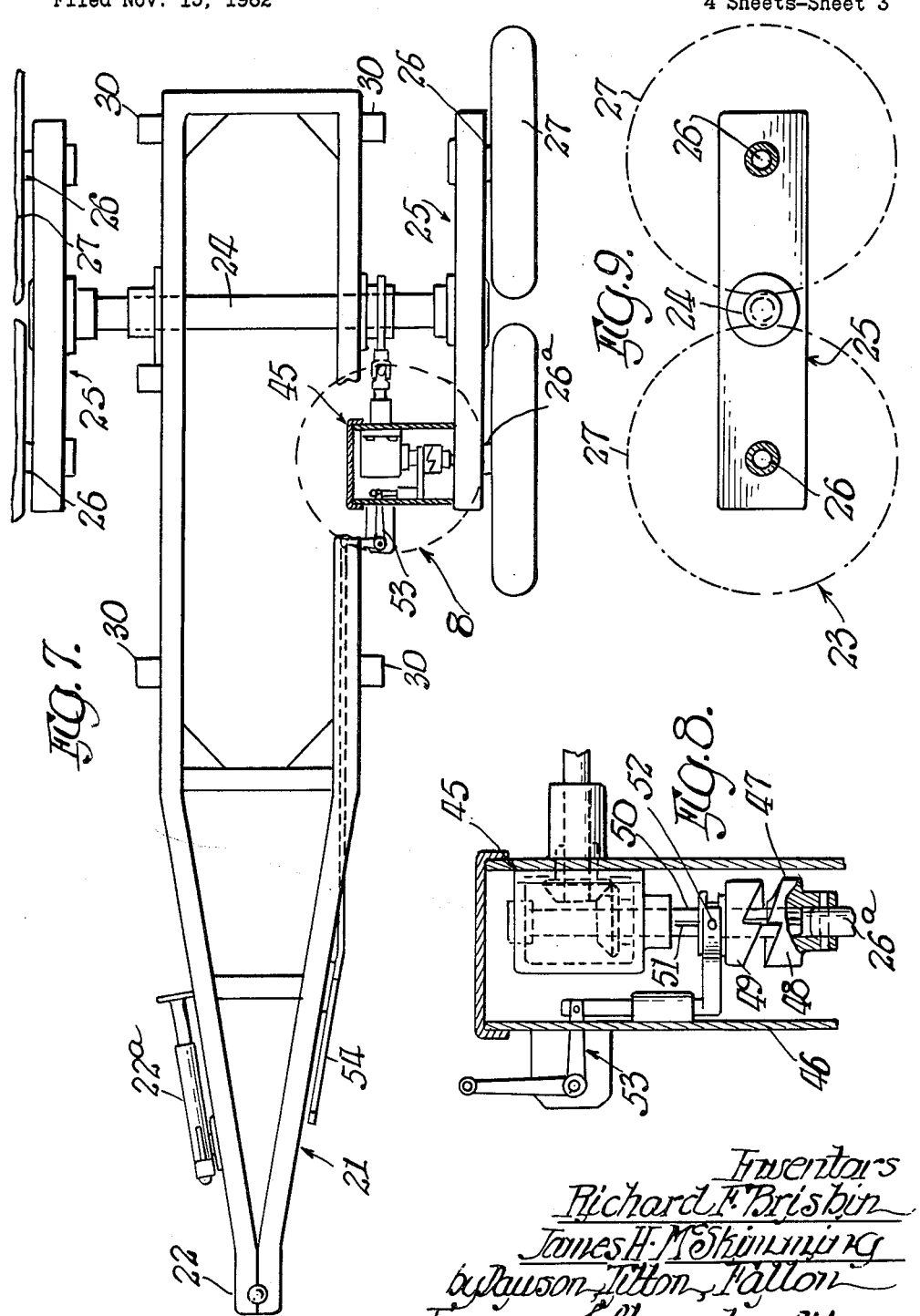

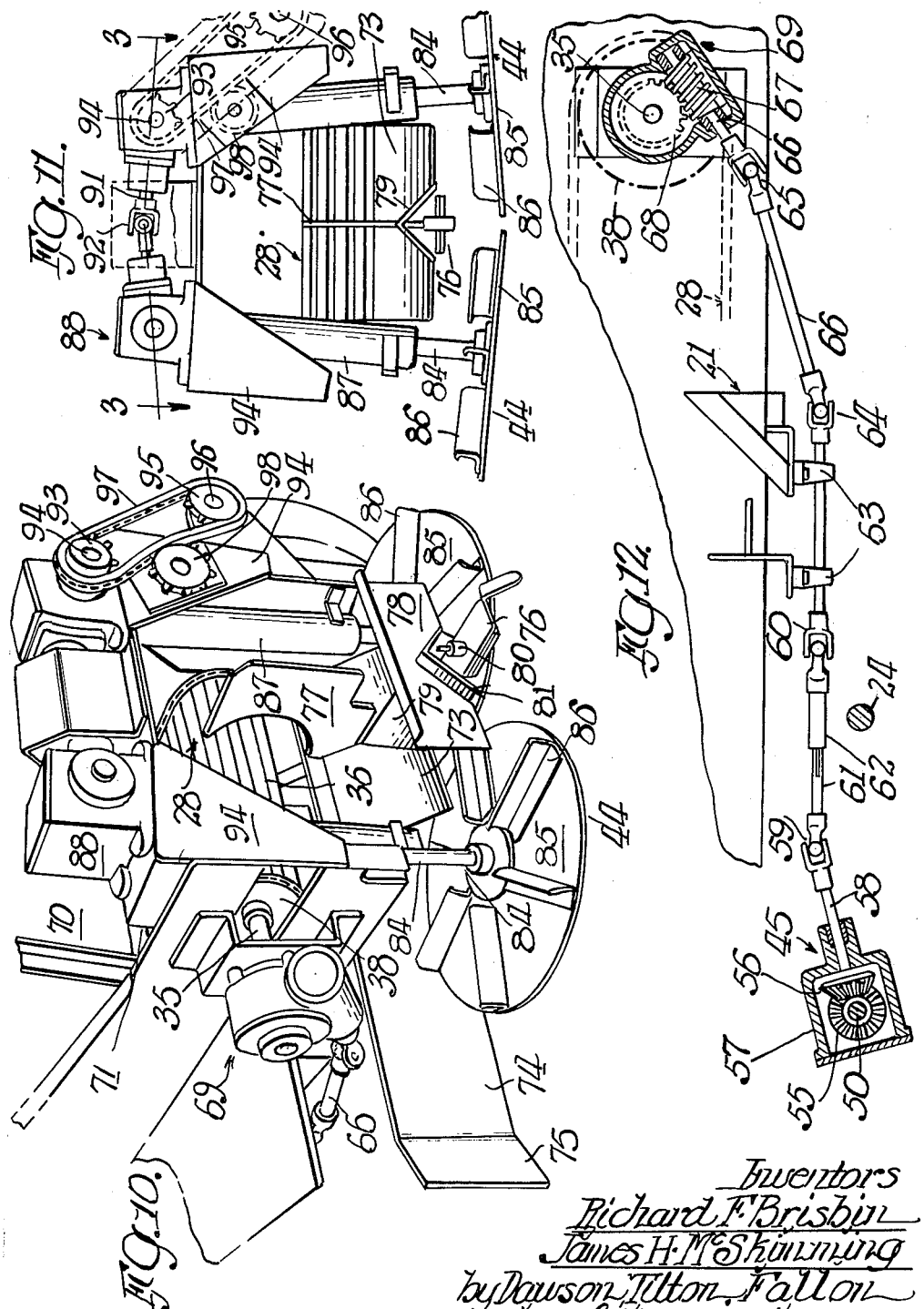

3,184,243
FERTILIZER WAGON
Richard F. Brisbin, Mount Vernon, and James H. McSkimming, Cedar Rapids, Iowa, assignors to Highway Equipment Company, Cedar Rapids, Iowa, a corporation
Filed Nov. 15, 1962, Ser. No. 237,870
3 Claims. (Cl. 275—6)

This invention relates to a fertilizer wagon, and, more particularly, to a spreading device for fertilizer adapted to be towed by a tractor, or the like, and wherein the distribution system has a novel arrangement to provide positive control of the fertilizer distribution while making the distribution in a uniform pattern.

It is a general object of this invention to provide a novel four-wheeled fertilizer-carrying vehicle which is equipped with a unique arrangement in the wheel and power train structure for effecting a uniform and positive distribution of fertilizer.

It will be appreciated that a principal problem in the distribution of fertilizer is the fact that the terrain is not always smooth, so that in the past it has required artful handling of the tractor and towed vehicle in order to achieve uniform fertilizer distribution. The provision of a wagon which automatically overcomes these drawbacks constitutes a corollary objective of the invention.

Another objective is to provide a fertilizer wagon which is uniquely constructed in the body portion and associated conveyor for developing a uniform pattern of fertilizer distribution irrespective of the variations in movement, speed, etc. of the wagon. In this connection, a uniform pattern of fertilizer is highly desirable, not only from the economic standpoint, but also a deficit or superfluity of fertilizer in a given location may preclude maximum utilization of the land.

Other objects and advantages of the invention may be seen in the details of construction and operation set down in this specification.

The invention is described in conjunction with an illustrative embodiment in the accompanying drawing, in which:

*First sheet of drawings*

FIG. 1 is a perspective view of the inventive wagon, with the view being taken from the rear left corner;

FIG. 2 is an enlarged fragmentary elevational view, partially in section, of the conveyor portion of the wagon;

FIG. 3 is a fragmentary elevational view, partially in section, showing the gear drives for the spinners which are located at the rearmost portion of the wagon, the view being taken along the sight line 3—3 of FIG. 11;

*Second sheet of drawings*

FIG. 4 is a side elevational view, seen from the right side of the wagon of FIG. 1, portions being shown in dotted line to reveal a partial section;

FIG. 5 is a transverse fragmentary sectional view taken along the sight line 5—5 of FIG. 4;

FIG. 6 is a fragmentary plan view of the conveyor assembly and drive provided as part of the wagon;

*Third sheet of drawings*

FIG. 7 is a plan elevational view, in fragmentary form, of the frame portion of the wagon;

FIG. 8 is a fragmentary, enlarged plan view of the portion encircled in FIG. 7 and designated by the numeral 8;

FIG. 9 is an enlarged side elevational view of the walking beam seen in FIG. 7 and which rotatably supports the wheels also seen in FIG. 7;

*Fourth sheet of drawings*

FIG. 10 is an enlarged fragmentary perspective view of the left rear portion of the wagon, essentially along the lines seen in smaller scale in FIG. 1;

FIG. 11 is a rear elevational view of the conveyor and spinner portion of the apparatus and which has applied thereto the sight line 3—3 corresponding to the view seen in FIG. 3; and FIG. 12 is a fragmentary side elevational view, partially in section, of the power transmission frame connecting the live front axle on the wagon to the conveyor drive shaft.

Referring now to the drawing, particularly FIG. 1 on the first sheet, the numeral 20 designates generally the inventive wagon, which includes an elongated frame 21 disposed generally parallel to the ground. The frame 21 can be best seen in plan elevational view in FIG. 7. The frame, at its forward end, is equipped with the usual clevis hitch connection 22 and also may be equipped with a supporting jack 22a (seen only in FIG. 4).

The frame 21 supports a main axle 24 (see FIGS. 4, 7 and 9) constituting part of an undercarriage generally designated 23 for the purpose of permitting the wagon to roll over the ground. For this purpose, the axle 24 is rigidly connected to the frame 21 and at the ends thereof is journaled in a pair of walking beams generally designated 25 (still referring to FIGS. 4, 7 and 9). Each walking beam 25 supports a pair of longitudinally spaced-apart stub axles or spindles 26, with each axle rotatably supporting a wheel 27, the power wheel being the left front wheel and designated 27a.

With the construction just described, the frame is free to pivot relative to the walking beams 25 so that the wheels 27 may become raised or lowered relative to the frame without disturbing the frame position relative to the ground. Thus, the conveyor generally designated 28 (see particularly FIGS. 4, 6 and 10) is maintained in a substantially uniform position to effectuate uniform distribution of fertilizer contained within the body or box generally designated 29, the portion of the wagon above the frame constituting a superstructure S (see FIGS. 1 and 4).

For the purpose of supporting the conveyor 28 and the body 29, the frame 21 is equipped with angle clips 30 (see FIG. 7). Boltably secured to the clips 30 are transverse channels 31 (see FIG. 4). The channels 31 support the side plates 32 and a bottom plate 32a defining the open-topped conveyor housing (see especially FIG. 2) and also serve as supports for the bearings 33 in which the conveyor front and rear cross shafts 34 and 35 are journaled (see FIG. 6). The conveyor 28 includes a plurality of crossbars 36 which extend between chains 37 (see FIG. 6), the chains being carried by sprockets 38 mounted on the cross shafts 34 and 35.

The body 29 extends upwardly from the channels 31 and is generally box-shaped at the top portion as at 39 in FIG. 1, and hopper-shaped at the lower portion as at 40 in FIG. 1. The front and rear end walls of the hopper portion 40 are inwardly and downwardly inclined as at 41 and 42, respectively (see FIG. 4). The body 29 is rigidly interconnected with the channel 31 and hence the frame 21 by means of stiffening ribs 43 which are boltably secured to the channels 31 and provided as weldments on the hopper portion 40 and housing walls 32 (see particularly FIG. 1).

Thus, the body 29, as well as the conveyor 28, is rigidly interconnected with the frame 21 and the fertilizer spreading operation is more or less independent of the terrain traversed by the wheels 27, the wheels 27 being able to oscillate independently of the frame 21 by virtue of the walking beam construction as at 25.

By virtue of the downwardly and inwardly sloping rear portion of the hopper, as at 42, there is provided an overhang or projection of the conveyor 28 as at 28a which provides a conveyor portion for maintaining fertilizer above the distributing spinners 44 (see FIG. 10) whenever the wheels 27 stop turning. The conveyor is synchronized with the left forward wheel 27a through a power train seen in FIG. 12 and which will now be described.

Power transmission train

In FIG. 7, the power train is seen to extend from the left front axle 26a through the gear drive 45 to the rear conveyor drive shaft 35 (see FIG. 12). At the extreme left-hand portion of FIG. 12, the numeral 45 designates generally the miter or bevel gear drive which is connected to the left front wheel 27a via the front axle 26a. The drive 45 can also be seen in plan view in FIG. 8, which is an enlarged fragmentary view of the encircled portion of FIG. 7. Referring, for the time being, to FIG. 8, it is seen that the front axle 26 extends into a housing 46 mounted on frame 21 and which houses a clutch 47. The clutch jaws 48 and 49 are mounted, respectively, on the stub axle 26a associated with the left front wheel, and gear input shaft 50. The drive clutch jaw 49 is slidable on the shaft 50 by virtue of the slot 51 and the key 52 so as to selectively couple the drive gear assembly 45 to the left front wheel axle 26a. For the purpose of moving the drive clutch jaw 49 into engagement with the axle clutch jaw 48, a linkage system generally designated 53 is provided, which terminates in a handle 54 (see FIG. 4).

Returning to FIG. 12, it is seen that a first miter gear 55 is mounted on the shaft 50 for cooperative action with a second miter gear 56, both gears being housed within a gear casing 57 and which provides bearings for the input shaft 50 and the output shaft 58 on which the second miter gear 56 is fixed.

The remainder of the train includes universal joints 59 and 60 suitably interconnected by a shaft 61 and equipped with a slip-joint coupling as at 62. It will be seen that the shafts 58 and 61 are angularly related so as to deliver rotative power from a point even with the main axle 44 to a point thereabove, i.e., the slip drive coupling 62 being located above the axle 24.

The power train also includes bearings as at 63, suitably supported on the frame 21, and third and fourth universal joints as at 64 and 65, suitably interconnected by a drive shaft 66. The output of the fourth universal joint is shaft 66. The shaft 66 is equipped with a worm 67 mounted in engagement with a worm gear 68 provided on the conveyor drive shaft 35.

In the operation of the power train, rotative motion from the left front wheel 27a is delivered to the gear drive 45 when the clutch jaws 48 and 49 are engaged. This rotative motion is delivered, in the illustration given, at a 1:1 ratio to the output shaft 58, and from there ultimately to the worm gear 67, which provides a 5:1 reduction. From what has been described before, it will be appreciated that the conveyor 28, and the reduction gear drive assembly generally designated 69, and the portion of the power train through the bearings 63, are all fixed to the frame to preclude relative lateral movement between the power train and the frame 21. Forwardly of the bearings 63, the power train is floatingly related to the frame, being tied to the left front axle 26a and therefore the left walking beam 25.

In the operation of the wagon 20, the travel of the conveyor 28 is directly tied to the left front wheel 27a, so that as the wagon speed is increased, the conveyor speed is increased proportionately. Should the wagon come to a stop, there is no need to shut off the conveyor 28, since this necessarily follows. Further, the conveyor maintains its uniform operation irrespective of the variations in terrain, since the wheels 27 may oscillate through the operation of the walking beams 25, yet the conveyor continues to operate in a normal, uniform fashion. The conveyor discharges fertilizer under a gate generally designated 70 in FIG. 1 and providing an opening 71 in the rear end wall 42 (see FIGS. 1 and 10) to a distribution system generally designated 72, which will now be described.

Distribution system

The distribution system can be most readily appreciated from a consideration of FIG. 10, where the conveyor 28 is seen to reverse its travel by passing around the sprocket 38 so as to deliver the granular fertilizer against a sloping discharge plate 73. The plate 73 is provided as part of a vertical shield 74 equipped with angled end portions 75. The vertical plate or shield 74 may be boltably connected to the main frame 21, and is equipped with a rearwardly-extending T-bar 76 (see FIGS. 1 and 10), which carries the shield assembly made up of the vertical shield 78, supporting bar 79, and rooster tail divider 77.

The upstanding, integral rooster tail 77 serves to divide the discharge stream of fertilizer into two portions, one for each of the spinners 44. The spinners 44 rotate to develop a fragmentary circular pattern of distribution, being aided in this connection by a vertical mounting plate 74 which is equipped with angled end portions as at 75.

This assembly slides on the T-bar 76 and is locked in place by a spring fastener 80. From time to time, the distributor or shield assembly 81 made up of the elements 77, 78 and 79 can be removed and a measuring-box 82 mounted in the place of the distributor assembly 81, after which the amount of fertilizer collected within the box 82 can be weighed by the scale 83 to determine the amount being distributed per unit of travel.

The spinners 44 are seen to be mounted on drive shafts 84 for rotation about axes which are generally vertical, as the shafts 84 upwardly and inwardly incline, so as to dispose the plate-like bottom portions 85 of the spinners at a slight angle to the horizontal. The plate-like portions 85 are equipped with a plurality of curved vane elements 86 to aid in distributing the granular fertilizer.

Each shaft 84 is journaled within a mounting tube 87 and is connected to its associated gear drive assembly generally designated 88. Each gear drive assembly 88 can be seen in FIG. 3, wherein each assembly includes a housing 89 for miter gears 90. The left-hand unit is connected by means of a power shaft 91, including a universal joint 92, to the right-hand unit, which in turn is powered through a sprocket 93, both the housings 88 being suitably fixed to pedestals 94 (see FIG. 11) provided as part of the conveyor housing 32.

The power for both the right-hand and left-hand units 88 is derived from a sprocket 93 which is mounted on a shaft 94 journaled in the housing 88 and which derives its power from a sprocket 95 fixed to a line shaft 96—the sprockets 93 and 95 being connected by means of a chain 97. The chain 97 is suitably tightened by means of an idler sprocket 98 mounted for rotation on the right-hand bracket 94.

The line shaft 96 can be readily seen in FIG. 4, and is seen to be journaled in the various ribs 43, terminating at the front of the wagon as at 99 for coupling to a power take-off of a tractor (not shown). The assembly 99 is seen in FIG. 5, and includes a chain and sprocket assembly generally designated 100, suitably mounted on the frame 21 and conveyor housing 32. The assembly 99 includes a main shaft 101 which can be coupled to the tractor or other towing vehicle through a suitable shaft (not shown). Thus, the spinners can be driven at any predetermined speed and independent of the forward motion of the wagon 20 and the conveyor speed—thus regulating the pattern independently, if desired.

A further means for regulating the amount of fertilizer distributed is provided in the form of the adjustable gate 70, which is seen to be mounted between angle guides 102 (again see FIG. 1). The gate 70 is moved angularly upwardly parallel to the plane of the rear wall 42 by virtue of a jack mechanism generally designated 103. The jack is equipped with the usual handle 104, and the upper end of the jack is equipped with an accordion-like cap 105 which precludes the entry of dust, debris, fertilizer, etc. into the ratchet mechanism of the jack.

In the illustration given, when the spinner speed is set at seven hundred ten r.p.m. from a tractor power take-off speed of five hundred forty r.p.m., the application rate of fertilizer can be varied from one hundred pounds to three tons per acre through the adjustment of the gate 70. Also, in the illustration given, the spread pattern can be varied from thirty to sixty feet wide, depending upon the material being spread and with a field speed up to fifteen miles per hour. For highway operation in relocation of the unit, speeds up to sixty miles per hour are obtainable.

The illustration given in FIG. 1 is seen to be equipped with side upper extensions as at 106 which are maintained in place by clips 107 and corner braces as at 108. In the preferred operation, the extensions are closed by a fabric cover 109 equipped with suitable eyelets 110, through which a rope 111 is passed and anchored under hooks 112 provided on the hopper portion 40 of the body 20.

While, in the foregoing specification, a detailed description of an embodiment of the invention has been set forth for the purpose of explanation thereof, many variations in the details herein given may be made by those skilled in the art without departing from the spirit and scope of the invention.

We claim:
1. A fertilizer wagon, comprising an elongated frame equipped with hitch means at the front end thereof for coupling to a tractor, or the like, an undercarriage secured to said frame and equipped with a pair of front and a pair of rear wheels to permit rolling movement of said vehicle over the ground, said undercarriage including a main axle extending transversely of said frame and spaced longitudinally rearwardly of the center of the frame, a walking beam pivotally connected to said axle at each end thereof at a point centrally longitudinally of each beam, a stub axle adjacent each beam end rotatably supporting one of said wheels whereby said wheels are adapted to move vertically independently of said frame, a superstructure secured to said frame for housing fertilizer to be distributed and including transversely-extending, longitudinally spaced beam members connected to said frame, a box-like housing secured to said beam members and equipped with an open top, a body equipped with an open top and open bottom above said housing and defined by inwardly convergent side and end walls, the rear end wall being equipped with a discharge opening for fertilizer and a gate positionably mounted on said rear end wall for varying the size of said opening, discharge means for fertilizer in said body including a longitudinally-extending conveyor projecting through said opening below said gate, and a pair of spinners mounted for rotation below the projecting portion of said conveyor for imparting a lateral motion to fertilizer discharged by said conveyor, and power means for said discharge means including a power train coupled to one of said front wheel stub axles and to said conveyor adjacent said rear end wall, said train being equipped with clutch means for disengaging said conveyor from said one stub axle, said train being secured to said frame at the rear train portion and floatingly related to said frame at the front train portion, and a second power train on said vehicle adapted to interconnect said spinners wih a power take-off on said tractor whereby three independent instrumentalities are provided to regulate the discharge rate of fertilizer.

2. The structure of claim 1 in which the first mentioned power train includes a miter gear assembly releasably connected to said stub axle and equipped with an output shaft extending angularly upwardly, said stub axle being associated with the left front wheel of said wagon, said second power train including a line shaft journaled on the right side of said body.

3. A fertilizer wagon, comprising an elongated frame equipped with hitch means at the front end thereof for coupling to a tractor, or the like, an undercarriage secured to said frame and equipped with a pair of front and a pair of rear wheels to permit rolling movement of said vehicle over the ground, said undercarriage including a main axle extending transversely of said frame and spaced longitudinally rearwardly of the center of the frame, a walking beam pivotally connected to said axle at each end thereof at a point centrally longitudinally of each beam, a stub axle adjacent each beam end rotatably supporting one of said wheels whereby said wheels are adapted to move vertically independently of said frame, a superstructure secured to said frame for housing fertilizer to be distributed and including transversely-extending, longitudinally spaced beam members connected to said frame, a box-like housing secured to said beam members and equipped with an open top, a body equipped with an open top and open bottom above said housing and defined by inwardly convergent side and end walls, the rear end wall being equipped with a discharge opening for fertilizer and a gate positionably mounted on said rear end wall for varying the size of said opening, discharge means for fertilizer in said body including a longitudinally-extending conveyor projecting through said opening below said gate, and a pair of spinners mounted for rotation below the projecting portion of said conveyor for imparting a lateral motion to fertilizer discharged by said conveyor, and power means for said discharge means including a power train coupled to one of said front wheel stub axles and to said conveyor adjacent said rear end wall, said train being secured to said frame at the rear train portion and floatingly related to said frame at the front train portion, and a second power train on said vehicle adapted to interconnect said spinners with a power take-off on said tractor whereby three independent instrumentalities are provided to regulate the discharge rate of fertilizer.

References Cited by the Examiner

UNITED STATES PATENTS

| | | | |
|---|---|---|---|
| 1,452,139 | 4/23 | Bailey | 275—5 |
| 1,636,828 | 7/27 | Neighbour | 275—5 |
| 3,010,726 | 11/61 | Smoker et al. | 275—4 |
| 3,085,807 | 4/63 | Tyler | 275—8 |

ABRAHAM G. STONE, *Primary Examiner.*
WILLIAM A. SMITH, *Examiner.*